(12) United States Patent
Tsubaki et al.

(10) Patent No.: US 6,307,732 B1
(45) Date of Patent: Oct. 23, 2001

(54) ALUMINUM ELECTROLYTIC CAPACITOR

(75) Inventors: Yuichiro Tsubaki, Uji; Hiroyuki Matsuura, Fushimi-ku; Munehiro Morokuma, Neyagawa; Koichiro Minato, Fushimi-ku; Yukihiro Nitta, Uji, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/417,116

(22) Filed: Oct. 13, 1999

(30) Foreign Application Priority Data

Oct. 13, 1998 (JP) .................................................. 10-290333
Sep. 9, 1999 (JP) .................................................. 11-255249

(51) Int. Cl.[7] .................................................. H01G 9/042
(52) U.S. Cl. .......................... 361/509; 361/509; 361/505; 361/502; 252/62.2
(58) Field of Search ..................................... 361/272, 433, 361/502, 305, 303, 527, 509, 511; 252/62.2

(56) References Cited

U.S. PATENT DOCUMENTS

| | | | |
|---|---|---|---|
| 4,786,429 | * 11/1988 | Mori et al. ........................... | 252/62.2 |
| 5,055,974 | * 10/1991 | Washio et al. ....................... | 361/527 |
| 5,973,912 | * 10/1999 | Kibi et al. ............................ | 361/502 |
| 6,058,006 | * 5/2000 | Yoshioka et al. ..................... | 361/511 |

FOREIGN PATENT DOCUMENTS

S62-145713  6/1987 (JP).
S62-145715  6/1987 (JP).

* cited by examiner

Primary Examiner—Anthony Dinkins
Assistant Examiner—Nguyen T Ha

(57) ABSTRACT

The present invention provides a highly reliable aluminum electrolytic capacitor which has no flash point and shows little change or degradation in external appearance and properties. The water content of electrolytic solution of the electrolytic capacitor of this invention is 20–90 wt % and one or more following compounds are included as main electrolytes in the electrolytic solution; ammonium formate, ammonium acetate, ammonium lactate, ammonium glycolate, ammonium oxalate, ammonium succinate, ammonium malonate, ammonium adipate, ammonium benzoate, ammonium glutarate, and ammonium azelate. The electrolytic solution also contains not less than 1 wt % of one or more compounds selected from organic carboxylic acids with a particular structure and ammonium salts of these organic acids. The melting point of the electrolytic solution is −10° C. and below, the chlorine content of a sealing material of the capacitor is not more than 300 ppm to the weight of the sealing material. The impedance ratio of 20° C. to −10° C. at 100 kHz of the aluminum electrolytic capacitor is 4 or less. The present invention can provide a highly reliable aluminum electrolytic capacitor of rated voltage of under 100V, which achieves superior impedance and low temperature properties, and has little risk of ignition even when the electrolytic solution is released.

20 Claims, 1 Drawing Sheet

ALUMINUM ELECTROLYTIC CAPACITOR

FIELD OF INVENTION

The present invention relates to a highly reliable aluminum electrolytic capacitor that uses an electrolytic solution having no flash points. The aluminum electrolytic capacitor enjoys such superior low temperature properties that it can be used in high temperature environments for long periods of time without showing significant external changes in shape or deterioration in electrical properties.

BACKGROUND OF THE INVENTION

FIG. 1 is a cross-sectional view of an aluminum electrolytic capacitor. As shown in FIG. 1, the anode foil 1 and cathode foil 2 are wound together with the separator 4 made of Manila hemp or Kraft paper to form a capacitor element. This capacitor element is placed together with a driving electrolytic solution (hereinafter, electrolytic solution) in a bottomed metal case 5 and an opening of the foregoing metal case is closed by sealing with a sealing material 6.

The anode foil 2 is produced by anodizing and forming a dielectric layer on an aluminum foil after expanding (roughening) its surface area by etching.

The electrolytic solution increases the electrostatic capacity through absorption to the anode foil 2. The electrolytic solution helps maintain a low level of leakage current since it can repair the dielectric layer of the anodized aluminum film using its own anodizing ability. Among the properties of the electrolytic solution, electrical conductivity has a significant influence on the impedance of the electrolytic capacitor.

Considering the above mentioned points, highly conductive electrolytic solutions stable at high temperatures may be used especially for a low impedance capacitor operating in an environmental temperature of not less than 105° C. and having a rated voltage of not more than 100V in particular. Such electrolytic solutions typically use γ-butyrolactone which has good low temperature and anodizing properties as a solvent, and quaternary ammonium salts of phthalic acid and maleic acid as electrolytes (refer to Japanese Laid Open Patent Publication No. S62-145713 and Japanese Laid Open Patent Publication No. S62-145715).

However, if the electrolytic capacitor using γ-butyrolactone as a solvent and quaternary ammonium salts of phthalic acid and maleic acid as an electrolyte, is continuously used in a high-humidity atmosphere, a strong alkali compound is generated at the cathode. The strong alkali compound corrodes the cathode lead and the sealing material 6 which contacts the cathode lead. The corrosion causes leakage of the electrolytic solution from the capacitor.

The effective alternative to avoid the foregoing problem is to use an electrolytic solution which does not generate large amounts of alkali compounds, namely the electrolytic solution using ethylene glycol and water as solvent and ammonia salts such as ammonium adipate as electrolyte.

The electrolytic solution using γ-butyrolactone as a solvent has a flash point of approximately 100° C. Therefore, it is impossible to avoid the possibility of ignition occurring when the electrolytic solution is released due to malfunction of the electric device or similar reasons when used in an environment above 100° C.

With regard to low rating voltage electrolytic capacitors of 100V or less at an operating temperature of 85° C., an electrolytic solution in which the solvent is a mixture of ethylene glycol and water and electrolyte, ammonium salts such as ammonium adipate and so on, can be used. Water is used to enhance electric conductivity. However, this kind of capacitor has the problem of not being able to be used for long periods of time at and above the boiling point of one of the solvents or water (100° C.). In experiments, a large amount of hydrogen gas was generated in a rated voltage test at 110° C. due to the reaction between aluminum and water. Generated hydrogen raised the internal pressure of the capacitor. As a result, in some cases, the safety valve at the bottom of the aluminum case broke. In a no-load shelf test at 110° C., the rate of change of post-test leakage current within 1000 hours was found to exceed +5000%.

In order to solve these problems a variety of methods have been proposed. Among them is a method in which various phosphor compounds are added to the electrolytic solution to suppress the reaction between the electrode foils and the water. Another method suggests that various nitrocompounds be added to absorb generated hydrogen gas. However, even with these methods, when dealing with electrolytic capacitors of rated voltage being 100V or less, it is difficult to maintain electric performance for a long time at 100° C. or higher if an electrolytic solution with a water content of over 20% is used.

Moreover, when highly conductive electrolytic solution with water content over 20% is used, chlorine contained in the sealing rubber causes a problem, which is not a problem with an electrolytic solution having water content of less than 20%. Namely, in a long-term load test at high temperatures, the anode aluminum lead was corroded, sometimes leading to an increase in current leakage or breaking of anode aluminum lead due to corrosion.

The present invention aims to provide highly reliable electrolytic capacitors by solving these problems associating with conventional electrolytic capacitors.

SUMMARY OF THE INVENTION

The water content of an electrolytic solution of the electrolytic capacitor of the present invention is 20~90 wt % and one or more of the following compounds are included as a main electrolyte in the electrolytic solution; ammonium formate, ammonium acetate, ammonium lactate, ammonium glycolate, ammonium oxalate, ammonium succinate, ammonium malonate, ammonium adipate, ammonium benzoate, ammonium glutarate, and ammonium azelate.

The electrolytic solution also contains not less than 1 wt % of one or more compounds selected from; trimethyl adipate, 1,6-decan dicarboxylic acid, sebacic acid, 1,7-octane dicarboxylic acid, butyl octane dicarboxylic acid, 3-tert-butyladipic acid, 3-tert-octyl-hexanedioic acid, 3-n-dodecyl-hexanedioic acid; organic carboxylic acids shown in the following formula (compounds 1), organic carboxylic acids shown in the following formula (compounds 2), or ammonium salts of these organic acids.

(Compounds 1)

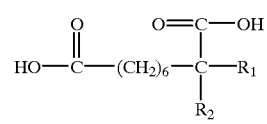

$R_2$: a lower alkyl radical, $R_1$: a hydrogen atom or following radical;

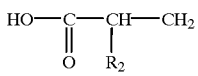

(Compounds 2)

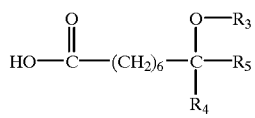

$R_3$, $R_4$: lower alkyl radicals and
$R_5$: a phenyl radical.

The electrolytic solution of the present invention does not have a flash point, and the melting point is not higher than −10° C. The chlorine content of the sealing material of the electrolytic capacitor to its weight is not more than 300 ppm. Moreover, the rated voltage of the electrolytic capacitor is 100V or less, and the impedance ratio of 20° C. to −10° C. at 100 kHz is not more than 4. The present invention can achieve a highly reliable aluminum electrolytic capacitor which is superior in impedance properties and low temperature properties, and rarely suffers ignition when the electrolytic solution is released.

DESCRIPTION OF THE PREFERRED EMBODIMENTS

Figure 1:
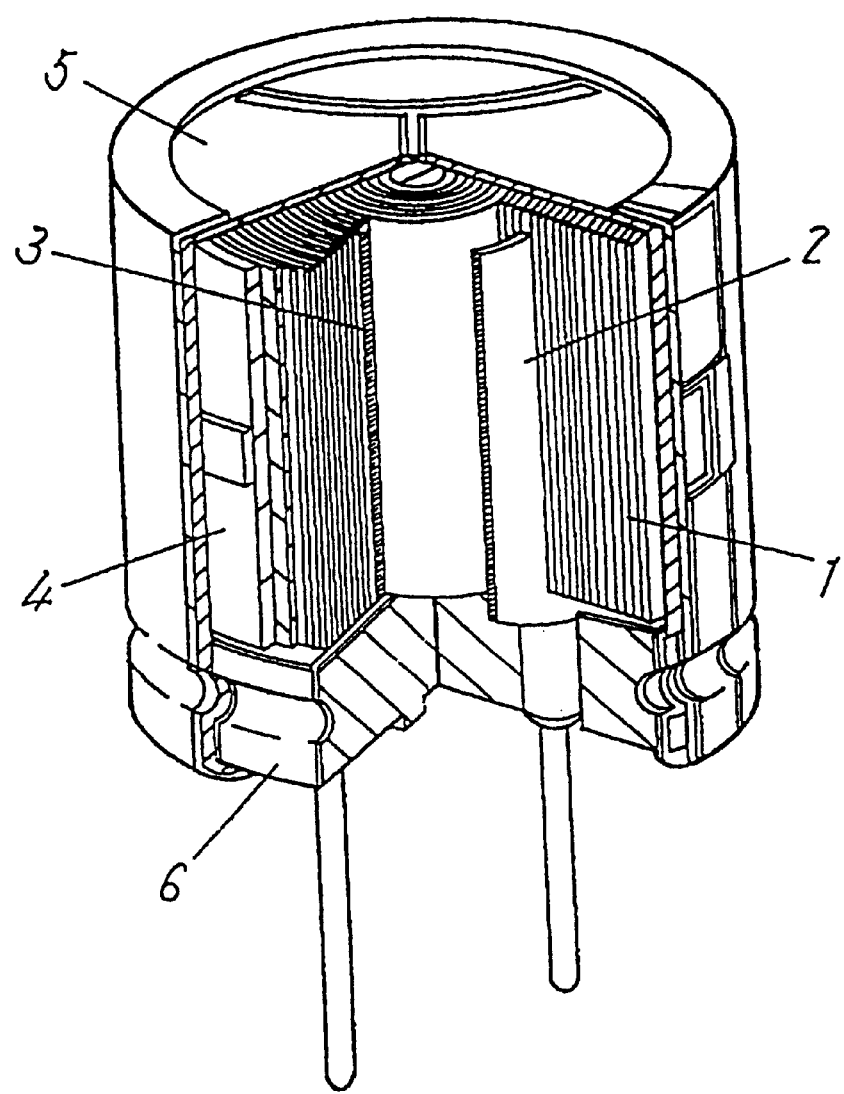
FIG. 1 shows a partial cross-sectional view illustrating construction of an electrolytic capacitor in a preferred embodiment of the present invention.

Preferred embodiments of the present invention are described below.

A capacitor element of an electrolytic capacitor of the present invention is produced by rolling up a laminate of an anode aluminum foil where a dielectric layer made of aluminum oxide is formed on the surface thereof and a cathode aluminum foil, with a separator in between. The capacitor element is soaked with an electrolytic solution and placed in a bottomed aluminum case and sealed at the opening to provide the electrolytic capacitor.

A water content of the electrolytic solution is between 20 and 90 wt %.

The electrolytic solution contains one or more following compounds as main electrolytes in the electrolytic solution;

ammonium formate, ammonium acetate, ammonium lactate, ammonium glycolate, ammonium oxalate, ammonium succinate, ammonium malonate, ammonium adipate, ammonium benzoate, ammonium glutarate and ammonium azelate.

The electrolytic solution also contains not less than 1 wt % of one or more compounds (hereinafter, reaction inhibitor) selected from;

trimethyl adipate, 1,6-decan dicarboxylic acid, sebacic acid, 1,7-octane dicarboxylic acid, butyl octane dicarboxylic acid, 3-tert-butyladipic acid, 3-tert-octyl-hexanedioic acid, 3-n-dodecyl-hexanedioic acid, organic carboxylic acids shown in compounds 1, organic carboxylic acids shown in compounds 2, or ammonium salts of these organic acids.

The electrolytic solution does not have a flash point, and the melting point of a electrolytic solution is not more than −10° C.

The rated voltage of the electrolytic capacitor is 100V or less, and the impedance ratio of 20° C. to −10° C. at 100 kHz is not more than 4.

When the water content of the electrolytic solution is less than 20%, electric conductivity at low temperatures is insufficient. Therefore, it is undesirable because the impedance ratio from 20° C. to −10° C. at 100 kHz exceeds 4. When the water content is over 90%, the melting point of the electrolytic solution may become greater than −10° C. Although the impedance property at 20° C. is secured, it is undesirable since the guaranteed temperature range is narrowed to over −10° C. at the lower temperature.

The reaction inhibitors bond to the surface of the electrode foils, thereby inhibiting a reaction with the water. They are especially effective when an electrolytic capacitor is used at high temperatures. When the content of the reaction inhibitors is 1 wt % or less, the protective effect of the anode foil deteriorates significantly.

The chlorine content of the sealing material of the electrolytic capacitor is not more than 300 ppm to the weight of the sealing material. When a sealing material with chlorine content to its own weight having over 300 ppm was used to construct the capacitor, chlorine compounds extracted from the sealing rubber were dissociated into ions in a rated voltage test conducted at 100° C. and above. The dissociated chlorine ions produce the anode aluminum lead corrosion under high temperatures. Thus, such sealing material is undesirable.

The amount of the swelling of the valve at the bottom of the aluminum case was found to be +1 mm or less within 1000 hours in a rated voltage test and a no-load shelf test conducted at 100° C. and above. The rate of change of leakage current within 100 hours in a no-load shelf test conducted at 100° C. and above was found to be within +5000% to the initial leakage current. When the swelling of the valve at the bottom of the aluminum case exceeded 1 mm and the rate of change of the current leakage within 1000 hours in a no-load shelf test became over +5000%, external appearance and electrical properties of the product were undesirably deteriorated.

Hereinafter, the following specific components and their composition of the present invention will be described.

The electrolytic solution of the present invention contains 1 or more organic solvents selected from alcohols, polyhydric alcohols, polyethylene glycol, and copolymers of ethylene oxide and propylene oxide. The electrolyte solution also contains main electrolytes, reaction inhibitors and one or more phosphor compounds (of not less than 0.01 wt %) selected from alkyl phosphoric acid ester, hypophosphorous acid, pyrophosphoric acid and salts of these acids. It further contains not less than 0.01 wt % of one or more nitro compounds selected from p-nitro phenol, m-nitro phenol, o-nitro phenol and p-nitro benzoic acid, m-nitro benzoic acid, o-nitro benzoic acid, p-nitro anisole, m-nitro anisole and o-nitro anisole.

Examples of solvents include alcohols such as monohydric alcohols (butyl alcohol, di-acetone alcohol, benzyl alcohol, amino alcohol, etc.); di-hydric alcohols (ethylene glycol, poly ethylene glycol, propylene glycol, 1,3-propanediol, 1,2-butandiol, 1,3-butandiol, 1,4-butandiol, 2,3-butandiol, 1,5-pentanediol, 2-methyl-2,4-pentanediol, 2-ethyl-1,3-hexanediol, di-ethyleneglycol, hexyleneglycol, phenyl glycol, etc.); tri-hydric alcohols (glycerol, polyglycerol, 2-ethyl-2-hydroxymethyl-1,3-propanediol, 1,2,6-hexanetriol, 3-methy-pentane-1,3,5-triol, etc.); hexytol etc., ether compounds such as monoethers (ethylene glycol monomethyl ether, diethylene glycol monomethyl ether, diethylene glycol monoethyl ether, ethylene glycol monophenyl ether, etc; diether compounds (ethylene glycol dimethyl ether, ethylene glycol diethyl ether, diethylene glycol dimethyl ether, diethylene glycol diethyl ether and so on. Further, copolymers of ethylene oxide and propylene oxide or the mixture of more than two compounds of the above alcohols, ether compounds and copolymers can be used as a solvent. Particularly preferable solvent among them is ethylene glycol, which has high solubility for any solutes and superior temperature properties.

The mixing ratio of the foregoing reaction inhibitors, when ethylene glycol is used as solvent, requires that the total content of the reaction inhibitors be from 5% to less than 500% of the main electrolytes. Furthermore, it is desirable that the total content of the main electrolytes and reaction inhibitors be 10 wt % or more of the weight of the electrolytic solution. With the above described mixing ratio, those compounds can bond to electrode foils, perform dielectric functions, and inhibit the hydrating reaction between the electrode foils and the water to avoid damaging the properties of the capacitor.

If the electrolytic solution contains not less than 0.01 wt % of one or more phosphor compounds selected from alkyl phosphoric acid ester, hypophosphorous acid, pyrophosphoric acid and salts of these acids, these compounds are absorbed by the electrode films and inhibit the reaction between the electrodes and the water to avoid damaging the properties of the capacitor. Furthermore, one or more nitro-compounds selected from p-nitro phenol, m-nitro phenol, o-nitro phenol and p-nitro benzoic acid, m-nitro benzoic acid, o-nitro benzoic acid, p-nitro anisole, m-nitro anisole and o-nitro anisole, perform the function of absorbing hydrogen gas due to the reducing property of nitro groups.

The foregoing phosphor compounds are especially absorbed by the cathode foil. In addition, the foregoing nitro-compounds further enhance the bonding of the reaction inhibitors to the cathode foil. Thus the nitro-compounds can effectively enhance the protective effect of the cathode foil against water. The concentration of the nitro-compounds is desirably 0.01 wt % or more against the electrolytic solution, otherwise the combined effect is lost.

One or more phosphor compounds selected from alkyl phosphoric acid ester, hypophosphorous acid, pyrophosphoric acid, and salts of these acids, or silicone compounds, silane coupling agent and alkoxy silane which can be described by the following general formula (compound 6) adhere either to the separator or electrode foils of the electrolytic capacitor of the present invention.
(Compound 6)

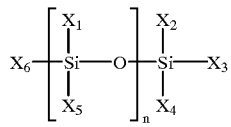

The silicone compounds include reactive silicone compounds such as hydroxy modified silicone, amino modified silicone, carboxy modified silicone, alcohol modified silicone, epoxy modified silicone, etc. Examples of $X_1$ through $X_6$ of silicone compounds are alkyl radicals such as methyl radical, ethyl radical, propyl radical, and butyl radical, alkenyl radicals such as vinyl radical, and allyl radical, aryl radicals such as phenyl radical, and naphthyl radical, aralkyl radicals such as benzyl radical, and phenethyl radical, hydroxide radicals or oxy-hydrocarbon radicals such as methoxy radical, ethoxy radical, propoxy radical, butoxy radical, vinyloxy radical, phenoxy radical, and benzyloxy radical. The examples of X1~X6 further include fatty acid carboxy radicals such as methyl carboxy radical, ethyl carboxy radical, and propyl carboxy radical, amino-hydrocarbon radicals such as methyl amine radical, ethyl amine radical, propyl amine radical, phenyl amine, etc. The silicone compounds for the electrolytic capacitor are not limited to the foregoing examples. Reactive silicone compounds in general can be used as well.

As silane coupling agents, the following examples can be used;

N-β(aminoethyl)γ-aminopropyl trimethoxy silane, N-β (aminoethyl)γ-aminopropyl methyl dimethoxy silane, N-β(aminoethyl) γ-aminopropyl triethoxy silane, γ-glycidoxy propyl trimethoxy silane, vinyl trimethoxy silane, vinyl triethoxy silane, vinyl tris (β-methoxy ethoxysilane), β-(3,4 epoxy cyclohexyl) ethyl trimethoxy silane, γ-glycidoxy propyl methyl diethoxy silane, γ-metacryloxy propyl methyl dimethoxy silane, γ-metacryloxy propyl methyl diethoxy silane, γ-aminopropyl triethoxy silane, N-phenyl-γ-aminopropyl trimethoxy silane, γ-mercaptopropyl trimethoxy silane and so on.

Examples of alcoxy silane include tetra-methoxy silane, and tetra-ethoxy silane.

The phosphor compounds (alkyl phosphoric acid ester) for the present invention are selected from one or more of the following examples;

mono methyl phosphate ester, mono ethyl phosphate ester, mono propyl phosphate ester, mono butyl phosphate ester, mono hexyl phosphate ester, mono octyl phosphate ester, mono decyl phosphate ester, dimethyl phosphate ester, diethyl phosphate ester, dipropyl phosphate ester, dihexyl phosphate ester, dioctyl phosphate ester, didecyl phosphate ester, trimethyl phosphate ester, triethyl phosphate ester, tripropyl phosphate ester, trihexyl phosphate ester, trioctyl phosphate ester, and tridecyl phosphate ester.

Compared to the method of simply immersing a capacitor element into an electrolytic solution which is mixed with phosphor compounds and silicone compounds similar to the foregoing examples in advance, the construction of the present invention allows those compounds easily to be close to the core of the capacitor element. Therefore, decline in electrostatic capacity and increase in hydrogen gas generation caused by the hydration reaction of the electrode foil can be further mitigated. Thus, a highly reliable capacitor can be provided.

On the other hand, a conventional production method of immersing a rolled-up type capacitor element into an electrolytic solution containing phosphoric compounds fails to allow phosphor compound additives and silicone compounds to reach the center of the capacitor element, resulting in uneven absorption of the compounds. With such problems, an electrolytic capacitor of the conventional production method is susceptible to degradation of electrode foils caused by a hydration reaction.

The inhibiting effect against degradation caused by hydration reaction is insufficient when the amount of the foregoing phosphor compounds and silicon compounds absorbed by the electrode foils is less than 0.5 mg/g of unit weight of the electrode foil. This is undesirable. On the contrary, when the amount of the adhering compounds to the electrode foils exceeds 5.0 mg/g of unit weight of the electrode foil, resistive components on the contacting surface between the electrolytic solution and electrode foils increase, thereby raising the impedance of the capacitor. Regarding the cathode foil, both anodized and non-anodized foils have the same effect. However, in order to enhance reliability, it is desirable to anodize the cathode at 1~2V.

As a sealing material for the present invention, isobutylene isoprene rubber, ethylene-propylene terpolymer and their mixture are used. The hardness of the sealing material (rubber) is desirably from 65 to 100 IRHD (International Rubber Hardness Unit). If the hardness of the sealing material is less than 65 IRHD, external appearance of the capacitor may change and the sealing rubber protrudes from the case undesirably when it is over 100° C., even with a capacitor which does not generate a large amount of gas. This is caused by vaporization of the water contained in the electrolytic solution. On the other hand, when the hardness exceeds 100 IRHD, the rubber becomes brittle and cracks during tests. Thus it is undesirable also. If the sealing material contains or is covered with silicone compounds, corrosion of anode lead is greatly suppressed. And evaporation of the solvents in the electrolytic solution is also inhibited, thereby curbing the decline of the electrostatic capacity.

The present invention is described below with reference to specific examples.

Table 1 shows an amount of phosphor or silicone compounds absorbed by the separator and electrode films, chlorine content of the sealing material, hardness of the sealing material, silicone compounds for which the surface treatment is provided, thickness of the bottom board of the aluminum case, and compounds used to treat the inside of the aluminum case.

With regard to composition of the electrolytic solution (parts by weight of the electrolytic solution), preferred embodiments 1, 3–22, 25 can be described as follows; ethylene glycol (65 parts by weight, hereinafter, the unit is omitted), pure water (35 ), ammonium adipate (12), ammonium 1,7-octane dicarboxylate (7), p-nitro benzoate(1), and ammonium hypophosphite (1). In the preferred embodiment 2, ammonium 1, 7-octane dicarboxylate (7) is replaced with ammonium 1, 5-decan dicarboxylate (7). In preferred embodiments 23 and 24, chemical compounds 7 (7) and 8 (7) described in an attached table are used respectively instead of ammonium 1, 7-octane dicarboxylate (7).

Hardness of the sealing rubber is 70 IRHD and its chlorine content is 100 ppm. In comparison, a test was conducted using a separator having 100 mg/g of ammonium hypophosphite absorbed thereto as a comparative example 8.

In a Cleaveland open-cup flash point test conducted on the electrolytic solution of the preferred embodiments 1~25, no flash points were observed between 128° C. ~134° C. When the electrolytic solution of the preferred embodiments were kept in a cryostat at constant temperature of −30° C., no change in the properties of the electrolytic solution was found. According to the test, the melting point of the electrolytic solution is confirmed to be −10° C. or less.

The chemical formula of the chemical compounds 7~14 shown in Table 1 and 2 are described in an attached paper.

Tables 2–5 show the impedance ratio of 20° C./100 kHz to −10° C./100 kHz of an electrolytic capacitor using the electrolytic solutions of the preferred embodiments 1~25 and the comparative examples 1–8, and the amount of swell of the bottom of the case, current leakage, the rate of change according to a 1000-hour rated voltage application test and a non-load shelf test conducted at 110° C., volume of the solvents permeated through the sealing rubber, the corrosive properties and the condition of the sealing rubber. In the research, two different rating aluminum electrolytic capacitors were used; capacitors with a rated voltage of 6.3V, the electrostatic capacity of 560 $\mu$F (8 mm in diameter×11 mm L), and 50V, 1500 $\mu$F (16 mm in diameter×35.5 mm L).

To deal with absorption of phosphor compounds and silicone compounds to the separator (using Manila hemp fiber), the electrode foils and the sealing rubber [isobutylene isopropylene rubber (butyl rubber) vulcanized with resin], the separator, the electrode films and sealing rubber are dipped in aqueous solution of phosphor compounds or silicone compounds of any specific concentration, then dried at 100° C. for one hour. The chlorine content of the sealing rubber was measured with a total chlorine analyzer (MITSUBISHI CHEMICAL CO., LTD. TSX-10) and the results were converted to the chlorine content per unit weight.

Tables 2–5 show that the aluminum electrolytic capacitor of the present invention is low in the impedance ratio, small in the amount of swell of the bottom of the aluminum case (changes in the length) and small in changes in leakage current, and its anode aluminum lead is not corroded, and the sealing rubber is not protruded.

As thus far described, the impedance ratio of 20° C. to −10° C. at 100 kHz of the electrolytic capacitor of the present invention is not more than 4. The amount of swell of the valve at the bottom of the aluminum case was found to be +1 mm or less within 1000 hours in a rated voltage load test and a no-load shelf test conducted at 100° C. and over. The rate of change in leakage current within 100 hours in a no-load shelf test conducted at 100° C. and over was found to be within +5000% to the initial leakage current. Thus, external appearance and the properties of the product are slightly affected when used at high temperatures for a long time. The electrolytic solutions have superior low temperature properties and a high water content. Therefore, the risk of ignition is small even when the safety valve works and the electrolytic solution is released due to abnormal voltage or inverse voltage applied to the electrolytic capacitor by malfunction of electric components. Thus, the present invention can provide a highly reliable aluminum electrolytic capacitor of rated voltage of under 100V, which achieves superior impedance and low temperature properties.

TABLE 1

| | | Separator Treatment | | Electrode Foil Treatment | | Sealing Rubber Treatment | Aluminum Case | |
| | | | | | | | Bottom | Treatment |
| | Electrolytic solution composition (Parts by weight) | Compound No. | Amount (mg/g) | Compound No. | Amount (mg/g) | Compound No. | Thickness (mm) | Compound No. |
| --- | --- | --- | --- | --- | --- | --- | --- | --- |
| Example 1 | EG(65), H$_2$O(35), NH$_4$AA(12), 1,7-ODCA(7).p-NO$_2$BA(1), NH$_4$HP(1) | — | — | — | — | — | 0.30 | — |
| 2 | EG(65), H$_2$O(35), NH$_4$AA(12), 1,6-DDCA(7), p-NO$_2$BA(1), NH$_4$HP(1) | — | — | — | — | — | 0.30 | — |

TABLE 1-continued

|  | Electrolytic solution composition (Parts by weight) | Separator Treatment | | Electrode Foil Treatment | | Sealing Rubber Treatment | Aluminum Case | |
|---|---|---|---|---|---|---|---|---|
|  |  | Compound No. | Amount (mg/g) | Compound No. | Amount (mg/g) | Compound No. | Bottom Thickness (mm) | Treatment Compound No. |
| 3 | EG(65), H₂O(35), NH₄AA(12), 1,7-ODCA(7), p-NO₂BA(1), NH₄HP(1) | NH₄HP | 50 | — | — | — | 0.30 | — |
| 4 | EG(65), H₂O(35), NH₄AA(12), 1,7-ODCA(7), p-NO₂BA(1), NH₄HP(1) | 9 | 50 | — | — | — | 0.30 | — |
| 5 | EG(65), H₂O(35), NH₄AA(12), 1,7-ODCA(7), p-NO₂BA(1), NH₄HP(1) | 10 | 50 | — | — | — | 0.30 | — |
| 6 | EG(65), H₂O(35), NH₄AA(12), 1,7-ODCA(7), p-NO₂BA(1), NH₄HP(1) | 11 | 50 | — | — | — | 0.30 | — |
| 7 | EG(65), H₂O(35), NH₄AA(12), 1,7-ODCA(7), p-NO₂BA(1), NH₄HP(1) | — | — | NH₄HP | 5 | — | 0.30 | — |
| 8 | EG(65), H₂O(35), NH₄AA(12), 1,7-ODCA(7), p-NO₂BA(1), NH₄HP(1) | — | — | 9 | 5 | — | 0.30 | — |
| 9 | EG(65), H₂O(35), NH₄AA(12), 1,7-ODCA(7), p-NO₂BA(1), NH₄HP(1) | — | — | 10 | 5 | — | 0.30 | — |
| 10 | EG(65), H₂O(35), NH₄AA(12), 1,7-ODCA(7), p-NO₂BA(1), NH₄HP(1) | — | — | 11 | 5 | — | 0.30 | — |
| 11 | EG(65), H₂O(35), NH₄AA(12), 1,7-ODCA(7), p-NO₂BA(1), NH₄HP(1) | — | — | 12 | 5 | — | 0.30 | — |
| 12 | EG(65), H₂O(35), NH₄AA(12), 1,7-ODCA(7), p-NO₂BA(1), NH₄HP(1) | — | — | 13 | 5 | — | 0.30 | — |
| 13 | EG(65), H₂O(35), NH₄AA(12), 1,7-ODCA(7), p-NO₂BA(1), NH₄HP(1) | — | — | 14 | 5 | — | 0.30 | — |
| 14 | EG(65), H₂O(35), NH₄AA(12), 1,7-ODCA(7), p-NO₂BA(1), NH₄HP(1) | — | — | — | — | 6 | 0.30 | — |
| 15 | EG(65), H₂O(35), NH₄AA(12), 1,7-ODCA(7), p-NO₂BA(1), NH₄HP(1) | — | — | — | — | 7 | 0.30 | — |
| 16 | EG(65), H₂O(35), NH₄AA(12), 1,7-ODCA(7), p-NO₂BA(1), NH₄HP(1) | — | — | — | — | 8 | 0.30 | — |
| 17 | EG(65), H₂O(35), NH₄AA(12), 1,7-ODCA(7), p-NO₂BA(1), NH₄HP(1) | — | — | — | — | — | 0.40 | — |
| 18 | EG(65), H₂O(35), NH₄AA(12), 1,7-ODCA(7), p-NO₂BA(1), NH₄HP(1) | — | — | — | — | — | 0.30 | NH₄HP |
| 19 | EG(65), H₂O(35), NH₄AA(12), 1,7-ODCA(7), p-NO₂BA(1), NH₄HP(1) | — | — | — | — | — | 0.30 | 6 |
| 20 | EG(65), H₂O(35), NH₄AA(12), 1,7-ODCA(7), p-NO₂BA(1), NH₄HP(1) | — | — | — | — | — | 0.30 | 7 |
| 21 | EG(65), H₂O(35), NH₄AA(12), 1,7-ODCA(7), p-NO₂BA(1), NH₄HP(1) | — | — | — | — | — | 0.30 | 8 |
| 22 | EG(65), H₂O(35), NH₄AA(12), 1,7-ODCA(7), p-NO₂BA(1), NH₄HP(1), PAMO(0.5) | — | — | — | — | — | 0.30 | — |
| 23 | EG(65), H₂O(35), NH₄AA(12), p-NO₂BA(1), NH₄HP(1) | — | — | — | — | — | 0.30 | — |
| 24 | EG(65), H₂O(35), NH₄AA(12), p-NO₂BA(1), NH₄HP(1) | — | — | — | — | — | 0.30 | — |
| 25 | EG(30), H₂O(60), NH₄AA(12), 1,7-ODCA(7), p-NO₂BA(1), NH₄HP(1) | — | — | — | — | — | 0.30 | — |
| Comparative Ex. 1 | EG(65), H₂O(35), NH₄AA(12), 1,7-ODCA(7), p-NO₂BA(1), NH₄HP(1) | — | — | — | — | — | 0.30 | — |
| 2 | EG(65), H₂O(35), NH₄AA(12), 1,7-ODCA(7), p-NO₂BA(1), NH₄HP(1) | — | — | — | — | — | 0.30 | — |
| 3 | EG(65), H₂O(35), NH₄AA(12), 1,7-ODCA(7), p-NO₂BA(1), NH₄HP(1) | — | — | — | — | — | 0.30 | — |
| 4 | EG(65), H₂O(35), NH₄AA(12), 1,7-ODCA(7), p-NO₂BA(1), NH₄HP(1) | — | — | — | — | — | 0.30 | — |
| 5 | EG(65), H₂O(35), NH₄AA(12), 1,7-ODCA(7), p-NO₂BA(1), NH₄HP(1) | — | — | — | — | —* | 0.30 | — |
| 6 | EG(65), H₂O(35), NH₄AA(12), 1,7-ODCA(7), p-NO₂BA(1), NH₄HP(1) | — | — | — | — | —** | 0.30 | — |
| 7 | EG(65), H₂O(35), NH₄AA(12), 1,7-ODCA(7), p-NO₂BA(1), NH₄HP(1) | — | — | — | — | — | 0.25 | — |
| 8 | EG(65), H₂O(35), NH₄AA(12), 1,7-ODCA(7), p-NO₂BA(1), NH₄HP(1) | NH₄HP | 100 | — | — | — | 0.30 | — |

EG: ethylene glycol
NH₄AA: ammonium adipate
ammonium: "1,-7-octane di-carboxylic acid
p-NO₂BA: p-nitro benzoic acid
NH₄HP: ammonium hypophosphite
PAMO: phosphoric acid mono octyl ester
*Chlorine content of the sealing rubber is 100 ppm except Comparative Example 5 (350 ppm)
**Sealing Rubber Hardness is 70 except Comparative Example 6 (Rubber Hardness is 60)

TABLE 2

Capacitor Rating 6.3 V-560 μF(Size: Diameter 8 mm, Hight 11 mm) Number of Test Piece: 10

| | | Impedance Ratio | changes in the length(mm) | | Leakage Current Change(%) | | Permeation (mg) | Lead Corrosion | Sealing Rubber |
|---|---|---|---|---|---|---|---|---|---|
| | | | Loaded | No Load | Loaded | No Load | | | |
| Example | 1 | 3.0 | 0.14 | 0.13 | 85 | 115 | −9.7 | No | No Change |
| | 2 | 3.1 | 0.15 | 0.13 | 84 | 120 | −9.7 | No | No Change |
| | 3 | 3.3 | 0.09 | 0.10 | 83 | 108 | −9.5 | No | No Change |
| | 4 | 3.2 | 0.08 | 0.09 | 80 | 106 | −9.5 | No | No Change |
| | 5 | 3.0 | 0.09 | 0.08 | 78 | 100 | −9.1 | No | No Change |
| | 6 | 3.1 | 0.09 | 0.10 | 85 | 106 | −9.5 | No | No Change |
| | 7 | 3.2 | 0.11 | 0.09 | 90 | 110 | −9.7 | No | No Change |
| | 8 | 3.0 | 1.10 | 0.08 | 85 | 108 | −9.1 | No | No Change |
| | 9 | 3.2 | 0.09 | 0.07 | 82 | 107 | −9.5 | No | No Change |
| | 10 | 3.2 | 0.09 | 0.08 | 80 | 108 | −9.3 | No | No Change |
| | 11 | 3.2 | 0.10 | 0.09 | 80 | 107 | −9.5 | No | No Change |
| | 12 | 3.3 | 0.10 | 0.09 | 82 | 109 | −9.4 | No | No Change |
| | 13 | 3.2 | 0.10 | 0.10 | 81 | 110 | −9.6 | No | No Change |
| | 14 | 3.0 | 0.15 | 0.14 | 82 | 110 | −8.0 | No | No Change |
| | 15 | 3.2 | 0.16 | 0.13 | 85 | 117 | −7.8 | No | No Change |
| | 16 | 3.2 | 0.16 | 0.15 | 84 | 115 | −7.9 | No | No Change |
| | 17 | 3.0 | 0.06 | 0.03 | 78 | 114 | −9.3 | No | No Change |
| | 18 | 3.2 | 0.12 | 0.11 | 80 | 139 | −9.4 | No | No Change |
| | 19 | 3.2 | 0.12 | 0.11 | 80 | 139 | −9.3 | No | No Change |
| | 20 | 3.2 | 0.11 | 0.11 | 80 | 139 | −9.6 | No | No Change |
| | 21 | 3.2 | 0.12 | 0.11 | 80 | 139 | −9.7 | No | No Change |
| | 22 | 3.0 | 0.09 | 0.08 | 85 | 106 | −9.5 | No | No Change |
| | 23 | 3.0 | 0.11 | 0.08 | 88 | 118 | −9.6 | No | No Change |
| | 24 | 3.2 | 0.11 | 0.07 | 82 | 128 | −9.6 | No | No Change |
| | 25 | 3.2 | 0.17 | 0.15 | 80 | 139 | −11.3 | No | No Change |

TABLE 3

Capacitor Rating 6.3 V-560 μF(Size: Diameter 8 mm, Hight 11 mm) Number of Test Piece: 10

| | | Impedance Ratio | changes in the length(mm) | | Leakage Current Change (%) | | Permeation (mg) | Lead Corrosion | Sealing Rubber |
|---|---|---|---|---|---|---|---|---|---|
| | | | Loaded | No Load | Loaded | No Load | | | |
| Comparative Example | 1 | 3.1 | Valve Opened(1) | Valve Opened(1) | — | — | Not measurable | No | Expanded |
| | 2 | 3.2 | 0.56 | 0.48 | 112 | 5300 | −9.6 | No | Expanded |
| | 3 | 3.1 | Valve Opened(1) | Valve Opened(1) | — | — | Not measurable | No | Expanded |
| | 4 | 4.1 | 0.33 | 0.30 | 136 | 420 | −9.5 | No | No Change |
| | 5 | 3.0 | 0.55 | 0.50 | 120 | 6600 | −9.3 | Load Broken (2) | Expanded |
| | 6 | 3.3 | — | 0.42 | 86 | 130 | −9.5 | No | Protruded(3) |
| | 7 | 3.1 | Valve Opened(1) | Valve Opened(1) | — | — | −9.5 | No | No Change |
| | 8 | 4.6 | 0.29 | 0.48 | 91 | 123 | −9.6 | No | No Change |

(1): all of the test pieces
(2): 8 out of 10
(3): 5 out of 10

TABLE 4

Capacitor Rating 50 WV-1200 μF(Size: Diameter 16 mm, Hight 35.5 mm) Number of Test Piece: 10

| | | Impedance Ratio | changes in the length(mm) | | Leakage Current Change(%) | | Permeation (mg) | Lead Corrosion | Sealing Rubber |
|---|---|---|---|---|---|---|---|---|---|
| | | | Loaded | No Load | Loaded | No Load | | | |
| Example | 1 | 3.5 | 0.67 | 0.38 | 84 | 153 | −35.7 | No | No Change |
| | 2 | 3.5 | 0.68 | 0.40 | 86 | 148 | −35.7 | No | No Change |
| | 3 | 3.5 | 0.60 | 0.37 | 85 | 138 | −35.5 | No | No Change |
| | 4 | 3.4 | 0.58 | 0.29 | 97 | 133 | −35.5 | No | No Change |
| | 5 | 3.8 | 0.60 | 0.27 | 82 | 114 | −35.1 | No | No Change |
| | 6 | 3.2 | 0.60 | 0.28 | 81 | 123 | −35.5 | No | No Change |
| | 7 | 3.6 | 0.63 | 0.29 | 96 | 138 | −35.7 | No | No Change |

TABLE 4-continued

Capacitor Rating 50 WV-1200 μF(Size: Diameter 16 mm, Hight 35.5 mm) Number of Test Piece: 10

|   | Impedance Ratio | changes in the length(mm) Loaded | No Load | Leakage Current Change(%) Loaded | No Load | Permeation (mg) | Lead Corrosion | Sealing Rubber |
|---|---|---|---|---|---|---|---|---|
| 8 | 3.4 | 0.62 | 0.25 | 92 | 139 | −35.1 | No | No Change |
| 9 | 3.2 | 0.61 | 0.24 | 82 | 122 | −35.5 | No | No Change |
| 10 | 3.5 | 0.60 | 0.28 | 84 | 133 | −35.3 | No | No Change |
| 11 | 3.6 | 0.62 | 0.30 | 86 | 138 | −35.5 | No | No Change |
| 12 | 3.5 | 0.61 | 0.27 | 85 | 138 | −35.4 | No | No Change |
| 13 | 3.5 | 0.61 | 0.29 | 97 | 143 | −35.6 | No | No Change |
| 14 | 3.3 | 0.72 | 0.44 | 82 | 144 | −31.0 | No | No Change |
| 15 | 3.2 | 0.70 | 0.45 | 81 | 143 | −30.8 | No | No Change |
| 16 | 3.7 | 0.70 | 0.45 | 96 | 148 | −30.9 | No | No Change |
| 17 | 3.4 | 0.38 | 0.16 | 92 | 149 | −35.3 | No | No Change |
| 18 | 3.2 | 0.63 | 0.34 | 82 | 152 | −35.4 | No | No Change |
| 19 | 3.4 | 0.64 | 0.35 | 85 | 145 | −35.3 | No | No Change |
| 20 | 3.2 | 0.62 | 0.35 | 81 | 143 | −35.6 | No | No Change |
| 21 | 3.6 | 0.64 | 0.35 | 96 | 148 | −35.7 | No | No Change |
| 22 | 3.4 | 0.60 | 0.36 | 92 | 129 | −35.5 | No | No Change |
| 23 | 3.2 | 0.63 | 0.34 | 82 | 132 | −35.6 | No | No Change |
| 24 | 3.4 | 0.63 | 0.40 | 85 | 135 | −35.6 | No | No Change |
| 25 | 3.1 | 0.78 | 0.40 | 85 | 135 | −39.3 | No | No Change |

TABLE 5

Capacitor Rating 50 WV-1200 μF(Size: Diameter 16 mm, Hight 35.5 mm) Number of Test Piece: 10

|   |   | Impedance Ratio | changes in the length(mm) Loaded | No Load | Leakage Current Change(%) Loaded | No Load | Permeation (mg) | Lead Corrosion | Sealing Rubber |
|---|---|---|---|---|---|---|---|---|---|
| Comparative Example | 1 | 3.3 | Valve Opened(1) | Valve Opened(1) | — | — | Not measurable | No | Expanded |
|  | 2 | 3.3 | 0.78 | 0.69 | 114 | 6800 | −35.6 | No | Expanded |
|  | 3 | 3.4 | Valve Opened(1) | Valve Opened(1) | — | — | Not measurable | No | Expanded |
|  | 4 | 4.2 | 0.75 | 0.53 | 136 | 4500 | −35.5 | No | Expanded |
|  | 5 | 3.6 | 0.95 | 0.80 | 126 | 12500 | −35.3 | Lead Broken (2) | Expanded |
|  | 6 | 3.4 | — | 1.16 | 84 | 136 | −35.5 | No | Protruded(3) |
|  | 7 | 3.5 | Valve Opened(1) | Valve Opened(1) | — | — | Not measurable | No | No Change |
|  | 8 | 4.8 | 0.70 | 0.58 | 96 | 162 | −35.6 | No | No Change |

(1): all of the test pieces
(2): 8 out of 10
(3): 5 out of 10

What is claimed is:

1. An aluminum electrolytic capacitor containing a driving electrolytic solution comprising water of 20–90% by weight, an electrolyte and not less than 1 wt % of organic carboxylic acid and/or an ammonium salt of organic carboxylic acid,
wherein;
said electrolyte is selected from more than one of the following compounds;
ammonium formate, ammonium acetate, ammonium lactate, ammonium glycolate, ammonium oxalate, ammonium succinate, ammonium malonate, ammonium adipate, ammonium benzoate, ammonium glutarate and ammonium azelate, and
said organic carboxylic acid and/or ammonium salt of organic carboxylic acid is one or more compounds selected from;
trimethyl adipate, 1,6-decan dicarboxylic acid, sebacic acid, 1,7-octane dicarboxylic acid, butyl octane dicarboxylic acid, 3-tert-butyladipic acid, 3-tert-octyl-hexanedioic acid, 3-n-dodecyl-hexanedioic acid, organic carboxylic acids shown in chemical formula 1, organic carboxylic acids shown in chemical formula 2, and/or ammonium salts of above organic acids.

(Chemical Formula 1)

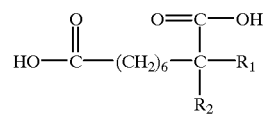

$R_1, R_2$: lower alkyl radicals, $R_1$: hydrogen atom or following radicals;

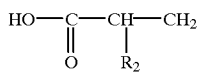

(Chemical Formula 2)

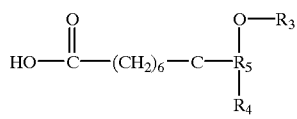

2. The aluminum electrolytic capacitor as set forth in claim 1,
wherein the ratio of an amount of said organic carboxylic acid and/or ammonium salt of organic carboxylic acid to an amount of said main electrolyte is between 0.05 and 5.0, and the total content of said main electrolyte and said organic carboxylic acid and/or ammonium salt of organic carboxylic acid is not less than 10 wt % of the weight of the electrolytic solution.

3. The aluminum electrolytic capacitor as set forth in claim 1, wherein said driving electrolytic solution further comprises:
organic solvent comprising one or more compounds selected from poly hydrolic alcohols, poly ethylene glycol, copolymer of ethylene oxide and propylene oxide,
not less than 0.01% by weight of one or more phosphor compounds selected from alkyl phosphoric acid ester, hypophosphorous acid, pyrophosphoric acid and salts of these acids, and
not less than 0.01% by weight of one or more nitro compounds selected from p-nitro phenol, m-nitro phenol, o-nitro phenol and p-nitro benzoic acid, m-nitro benzoic acid, o-nitro benzoic acid, p-nitro anisole, m-nitro anisole and o-nitro anisole.

4. The aluminum electrolytic capacitor as set forth in claim 3, wherein said alkyl phosphoric acid ester comprises one or more compounds selected from monoalkyl phosphoric acid ester, dialkyl phosphoric acid ester and trialkyl phosphoric acid ester, and the total number of carbon atoms of said alkyl chain in one molecule is 3–36.

5. The aluminum electrolytic capacitor as set forth in claim 4, wherein said alkyl phosphoric acid ester comprises one or more compounds selected from;
mono methyl phosphate ester, mono ethyl phosphate ester, mono propyl phosphate ester, mono butyl phosphate ester, mono hexyl phosphate ester, mono hexyl phosphate ester, mono octyl phosphate ester, mono decyl phosphate ester, dimethyl phosphate ester, diethyl phosphate ester, dipropyl phosphate ester, dihexyl phosphate ester, dioctyl phosphate ester, didecyl phosphate ester, trimethyl phosphate ester, triethyl phosphate ester, tripropyl phosphate ester, trihexyl phosphate ester, trioctyl phosphate ester, and tridecyl phosphate ester.

6. An aluminum electrolytic capacitor, wherein one or more compounds selected from alkyl phosphoric acid ester, hypophosphorous acid, pyrophosphoric acid and salts of these acids, silicone compounds shown in the formula provided below, silane coupling agent, or alkoxysilane are absorbed by a separator,

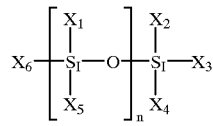

$X_1, X_5, X_6$: alkyl radicals, alkenyl radicals, aryl radicals and aralkyl radicals,
$X_2, X_3, X_4$: hyroxyl radical alkyloxy radicals.

7. The aluminum electrolytic capacitor as set forth in claim 6, wherein the amount of the absorbed compound is in a range between 5.0 and 50.0 mg/g to per unit weight of the separator.

8. An aluminum electrolytic capacitor, wherein one or more compounds selected from alkyl phosphoric acid ester, hypophosphorous acid, pyrophosphoric acid and salts of these acids, silicone compounds shown in the formula provided below, silane coupling agent, or alkoxysilane are adhering to at least one of anode aluminum foil and cathode aluminum foil,

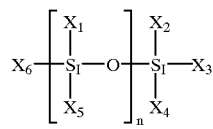

$X_1, X_5, X_6$: alkyl radicals, alkenyl radicals, aryl radicals and aralkyl radicals
$X_2, X_3, X_4$: hyroxyl radical alkyloxy radicals.

9. The aluminum electrolytic capacitor as set forth in claim 8, wherein the adhering amount of said compounds is 5.0–50.0 mg/g to per unit weight of the electrode foils.

10. The aluminum electrolytic capacitor as set forth in claim 1, further comprising a case containing the driving electrolytic solution and anode and cathode foils, the case having an opening, wherein a sealing material comprises one of isobutylene isoprene rubber, ethylene-propylene terpolymer and their mixed compounds, and the hardness of said material is 65–100 IRHD (International Rubber Hardness Unit), the sealing material covering the opening.

11. The aluminum electrolytic capacitor as set forth in claim 10, wherein a chlorine content of the sealing material is 300 ppm and less.

12. The aluminum electrolytic capacitor as set forth in claim 10, wherein silicone compounds shown in the formula provided below, silane coupling agent, or alkoxysilane are included in the sealing material or adhered to it,

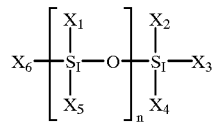

$X_1, X_5, X_6$: alkyl radicals, alkenyl radicals, aryl radicals and aralkyl radicals
$X_2, X_3, X_4$: hyroxyl radical alkyloxy radicals.

13. An aluminum electrolytic capacitor, wherein one or more compounds selected from alkyl phosphoric acid ester, hypophosphorous acid, pyrophosphoric acid and salts of these acids, silicone compounds shown in the formula provided below, silane coupling agent, or alkoxysilane are adhering to the inside of an aluminum case,

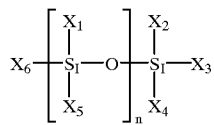

$X_1$, $X_5$, $X_6$: alkyl radicals, alkenyl radicals, aryl radicals and aralkyl radicals $X_2$, $X_3$, $X_4$: hyroxyl radical alkyloxy radicals.

14. The aluminum electrolytic capacitor as set forth in claim 1, wherein the melting point of said driving electrolytic solution is −10° C. or less.

15. The aluminum electrolytic capacitor as set forth in claim 1 in which the rated voltage is 100V or less, and the impedance ratio of 20° C. to −10° C. at 100 kHz is 4 or less.

16. The aluminum electrolytic capacitor as set forth in claim 1, further comprising a case containing the driving electrolytic solution, wherein an amount of swelling of a valve at the bottom of the case is +1 mm or less within 1000 hours according to a rated voltage load test and a no-load shelf test conducted at 100° C. and above, and the rate of change in current leakage within 100 hours according to a no-load shelf test conducted at 100° C. and above is within +5000% to the initial current leakage.

17. The aluminum electrolytic capacitor as set forth in claim 1, further comprising a case containing the driving electrolytic solution, the case having two ends, one end covered by a bottom board, wherein a thickness of the bottom board of the aluminum case which is made of either aluminum or aluminum alloy, is over 0.30 mm.

18. The aluminum electrolytic capacitor as set forth in claim 5, further comprising a case containing the driving electrolytic solution, the case having two ends, one end covered by a bottom board, wherein a thickness of the bottom board of the aluminum case which is made of either aluminum or aluminum alloy, is over 0.30 mm.

19. The aluminum electrolytic capacitor as set forth in claim 8, further comprising a case containing the driving electrolytic solution, the case having two ends, one end covered by a bottom board, wherein a thickness of the bottom board of the aluminum case which is made of either aluminum or aluminum alloy, is over 0.30 mm.

20. The aluminum electrolytic capacitor as set forth in claim 12, further comprising a case containing the driving electrolytic solution, the case having two ends, one end covered by a bottom board, wherein a thickness of the bottom board of the aluminum case which is made of either aluminum or aluminum alloy, is over 0.30 mm.

* * * * *